United States Patent [19]

Nicoll

[11] 3,994,364
[45] Nov. 30, 1976

[54] MUFFLERS

[76] Inventor: Walter Lyon Gordon Nicoll, 57, Hurlingham Court, Ranelagh Gardens, London, SW. 6, England

[22] Filed: Dec. 6, 1973

[21] Appl. No.: 422,300

[30] Foreign Application Priority Data

Dec. 6, 1972 United Kingdom............... 56335/72

[52] U.S. Cl. ................................ 181/47 R; 181/61
[51] Int. Cl.² ............................................ F01N 1/00
[58] Field of Search............... 181/41, 42, 47 R, 70, 181/63, 72, 36 B, 49, 57 R

[56] References Cited
UNITED STATES PATENTS

| | | | |
|---|---|---|---|
| 763,221 | 6/1904 | Ullom .................................... | 181/57 |
| 1,454,986 | 5/1923 | Thomas ................................. | 181/49 |
| 1,761,471 | 6/1930 | Förstel .............................. | 181/47 R |
| 1,804,070 | 5/1931 | Sykes .................................. | 181/36 B |
| 2,614,647 | 10/1952 | Bryant................................. | 181/47 R |
| 2,922,486 | 1/1960 | McRee................................... | 181/57 |
| 2,958,390 | 11/1960 | Montague............................ | 181/57 |
| 3,159,237 | 12/1964 | Thomas ............................... | 181/42 |
| 3,191,715 | 6/1965 | Jettinghoff........................ | 181/47 R |

FOREIGN PATENTS OR APPLICATIONS

| | | | |
|---|---|---|---|
| 526,810 | 8/1954 | Belgium............................ | 181/47 R |
| 123,337 | 5/1900 | Germany........................... | 181/47 R |
| 505,792 | 7/1954 | Italy.................................. | 181/47 R |
| 493,611 | 2/1954 | Italy.................................... | 181/70 |
| 888,853 | 5/1962 | United Kingdom................... | 181/57 |

*Primary Examiner*—L. T. Hix
*Assistant Examiner*—Vit W. Miska
*Attorney, Agent, or Firm*—Cushman, Darby & Cushman

[57] ABSTRACT

This invention relates to mufflers for silencing noise created by exhaust gases emanating from internal combustion engines. The muffler comprises an enclosed casing of tubular form including a peripheral wall, an inlet pipe and an outlet pipe wherein at least the inlet pipe extends into the casing and the end of the inlet pipe disposed within the casing has an elongate aperture to direct gas leaving the inlet pipe into the interior of the casing.

5 Claims, 8 Drawing Figures

MUFFLERS

This invention relates to mufflers for silencing noise created by the exhaust gases emanating from internal combustion engines and other prime movers and simplifies the control of pollusive effluents.

Conventional mufflers, or silencers as they are sometimes called, usually comprise a tubular casing having an inlet and an outlet disposed at opposite ends of the casing for leading exhaust gases into and away from the casing. In such a muffler the exhaust gases flow longitudinally through the casing and, in order to muffle or reduce the intensity of the noise created, a series of plates or baffles which may be apertured are mounted within the casing and serve to produce a reversal of the sound waves and/or gas flow.

The plates or baffles are usually positioned at right angles to the direction of exhaust gas flow, and in addition to reducing the intensity of noise by reflection, the baffles produce an undesirable back pressure. On the other hand, a further and conventional muffler construction which is sometimes referred to as a "straight through type" absorbs the noise by using a perforated wall mounted within the casing, the sound waves being absorbed by a filler material such as glass fibre. This latter type of construction possesses little or no capacity for pollution control because the tubular casing of a conventional muffler possesses a relatively small cross-sectional area and, therefore, presents a correspondingly and relatively small expansion for the sound waves or dispersion area for filtration of the exhaust gases. In addition, the relatively high flow rate of exhaust gases through a conventional muffler prevents the use of full flow filters since, in use, these would quickly become clogged with combustion contaminents.

According to one form of this invention a muffler comprises an enclosed casing of tubular form including a peripheral wall, an inlet pipe and an outlet pipe wherein at least the inlet pipe extends into the casing and the end of the inlet pipe disposed within the casing has an elongate aperture of controlled width to direct gas leaving the inlet pipe into the interior of the casing. The elongate aperture may be inclined relative to the longitudinal axis of the inlet pipe. Preferably, the elongate aperture is contained in a plane which is skew relative to the longitudinal axis of the inlet pipe. Preferably, also, the elongate aperture is of sufficiently small cross-sectional area to allow no non frictional flow at determined frequencies in the audio spectrum.

In one particular embodiment of a muffler, the casing is of general triangular cross-section and the outlet pipe extends into the casing so that the portions of the inlet and the outlet pipe in the casing are disposed in longitudinal overlapping relationship. In this construction, the exhaust gases leaving the elongate aperture of the inlet pipe are reflected from various parts of the interior face of the casing wall before entering the outlet pipe. The said reflection serves to dampen the noise level of the gases and increase the overall effectiveness of the muffler. The elongate aperture also assists in damping the noise level as the slot width can be adjusted to allow no non frictional flow at various frequencies (Hz) and with this construction sound wave reflection continues within the silencer box while the gas flow outlet is virtually unrestricted.

For the purpose of purifying exhaust gas entering the muffler, a catalyst and/or filter material is disposed in the region of the elongate aperture. The catalyst material is either formed of or supported on a carrier made from expanded metal (for example, nichrome). The expanded metal may be made in the form of a pad forming an extension of or located within the elongate aperture. The rough surface presented by the expanded metal to the gas leaving the aperture serves to create turbulent flow having constantly changing flow characteristics over the surface and increasing actual air contact. Further, the passage of the gas over the catalyst, particularly if this is restricted in depth as in a narrow slot, is contributory in increasing the temperature of the gas and thereby assists in the catalysing reaction. The high temperature existing in the region of the catalyst additionally serves to burn up certain impurities within or entrained in the exhaust gases and acts as an after burner producing more complete combustion.

A muffler in accordance with the invention may include a separator mounted to extend longitudinally within the casing so as to divide the casing into two intercommunicating regions and having the inlet pipe opening into one of the said regions of the casing and the outlet pipe opening into the other region of the casing. If desired, the separator may be apertured or porous.

Preferably, the muffler includes means, such as a slot, within the casing in the vicinity of the or each inlet so as to silence and disperse incoming gases within the said first mentioned region of the casing and to direct the gases into a pollution control area where noxious pollutants are extracted from the gases.

According to another form of muffler in accordance with this invention, the circumferential wall is elliptical in cross-section and the separator extends diagonally with respect to the elliptical cross-section so as to increase the surface area.

In another construction, the separator may be chevron shaped in which case the apex of the chevron is located in the region of the inlet thereby performing the function of the divider. In this construction, that part of the separator in the vicinity of the apex is preferably plain and not apertured. The separator may also take the form of two chevron shaped pieces placed face to face thus forming a slot or slots both to assist in silencing the exhaust noise and to assist dispersion of the exhaust gases within the said first mentioned region and to direct the gases to the pollution control area.

If desired, the separator may form or incorporate a catalyst or filter for purifying the noxious gases contained within the exhaust. Alternatively, the filters or catalyst may be within the body of the muffler.

Various mufflers in accordance with the invention will now be described by way of example with reference to the accompanying drawings, FIGS. 4, 5 and 6 of which accompanied the Provisional Specification, in which.

Figure 1:
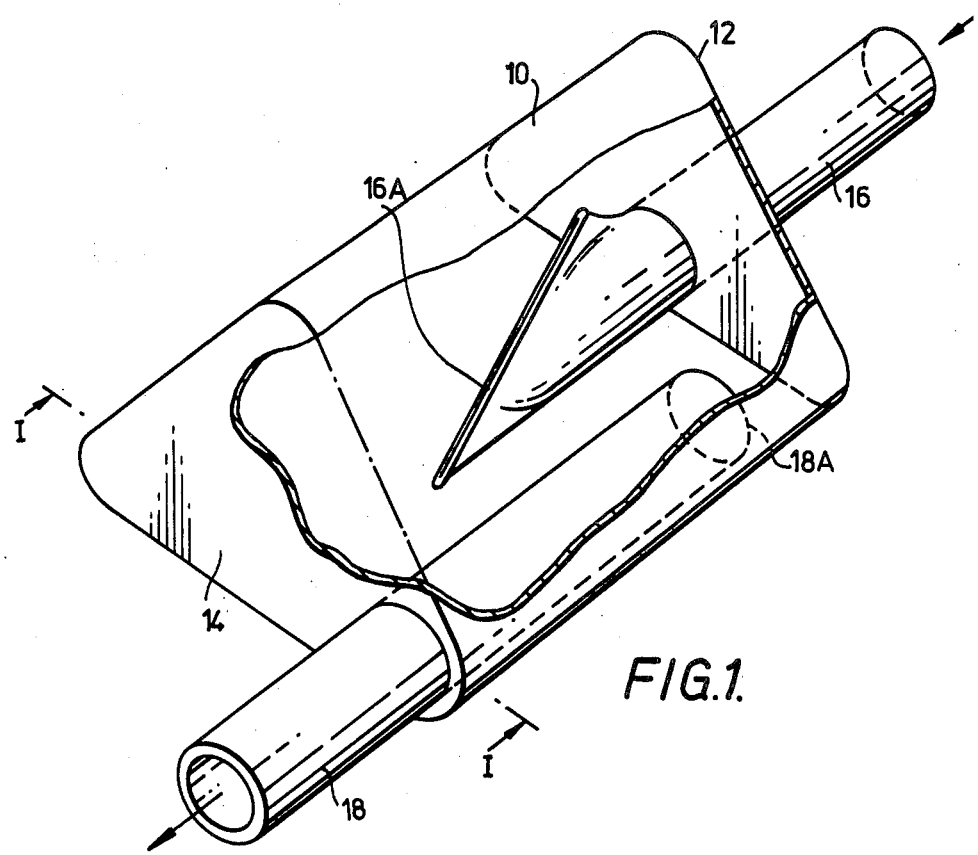
FIG. 1 is a perspective of a muffler in accordance with the invention showing a part of the muffler casing removed to reveal the internal structure of the muffler.
Figure 2:
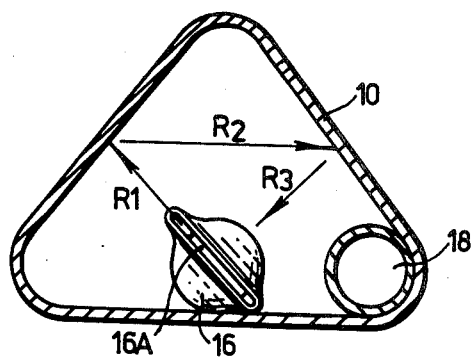
FIG. 2 is a section taken on line I—I of FIG. 1.

The muffler shown in FIG. 1 has a tubular casing 10 of general triangular cross-section and two triangular end walls 12 and 14. An inlet pipe 16 enters the muffler casing 10 through the end wall 12 in which the tube is welded. An outlet pipe 18 is welded in the end wall 14 as shown. The inlet pipe 16 is deformed to form a fantail having an elongate exit aperture 16A. The slot 16A is inclined to the longitudinal axis of the pipe 16 as shown in FIG. 2 and in operation exhaust gases leaving the outlet slot 16A follow a reflective pattern indicated by arrows R1, R2 and R3 (FIG. 2) before entering the outlet pipe 18 prior to leaving the muffler. It will be seen from FIG. 1 that the inlet of the outlet pipe 18A is positioned upstream of the outlet slot 16A of the inlet pipe.

Figure 3:
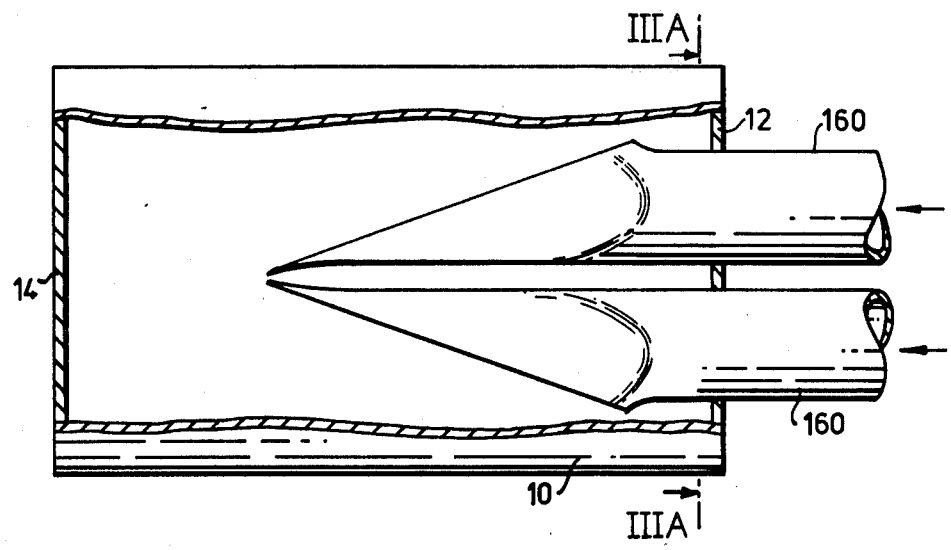
FIGS. 3 and 3A show in sectional plan (taken on III—III of FIG. 3A) and sectional end view (taken on IIIA—IIIA of FIG. 3) respectively, a modification of the muffler of FIGS. 1 and 2 with two inlets and a single outlet.
Figure 3A:
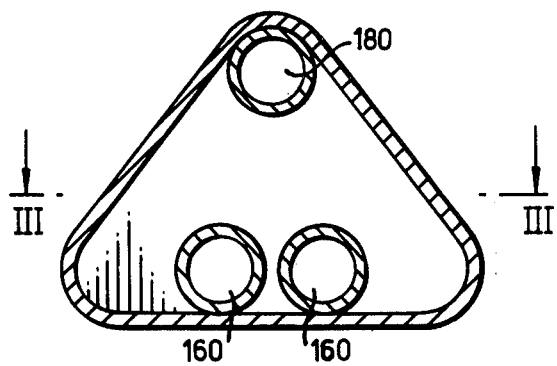

FIG. 3 shows a modification of the embodiment of FIGS. 1 and 2 and in this embodiment two inlet pipes 160 are mounted adjacent one another as shown in FIG. 3 and the outlet pipe 180 is, in this case, mounted in the apex of the triangular section casing as shown in FIG. 3A.

Figure 4:
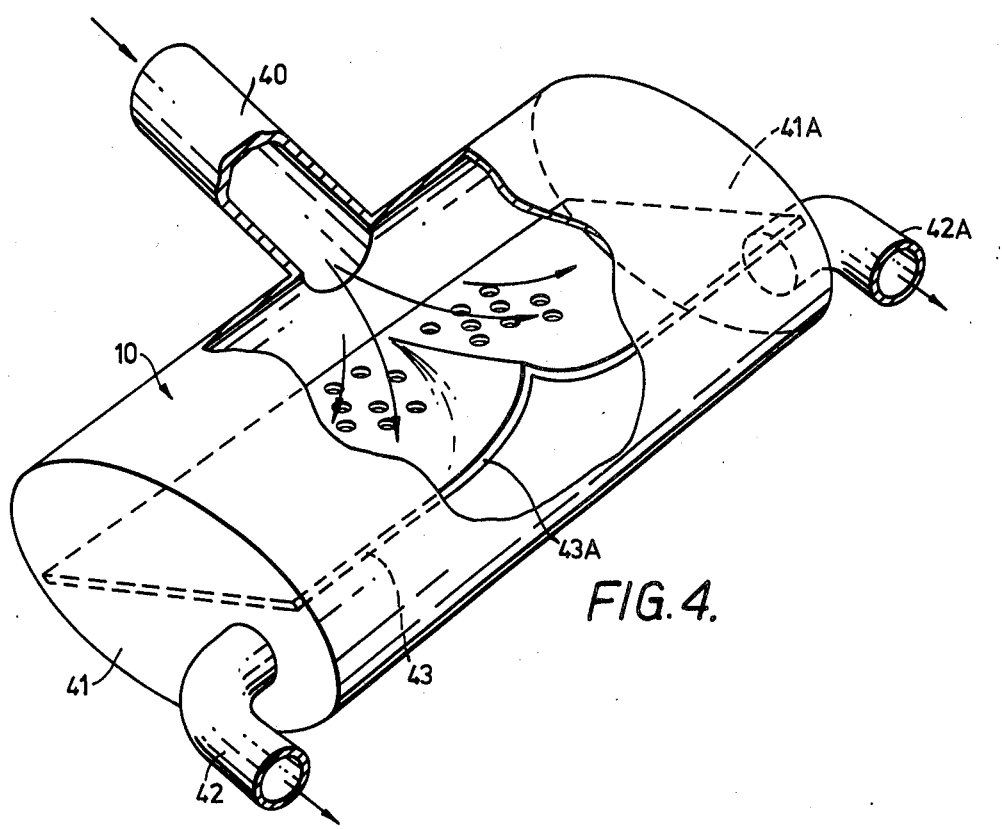
FIGS. 4 and 4A show another muffler in accordance with the invention with a portion of the casing removed.
Figure 4A:
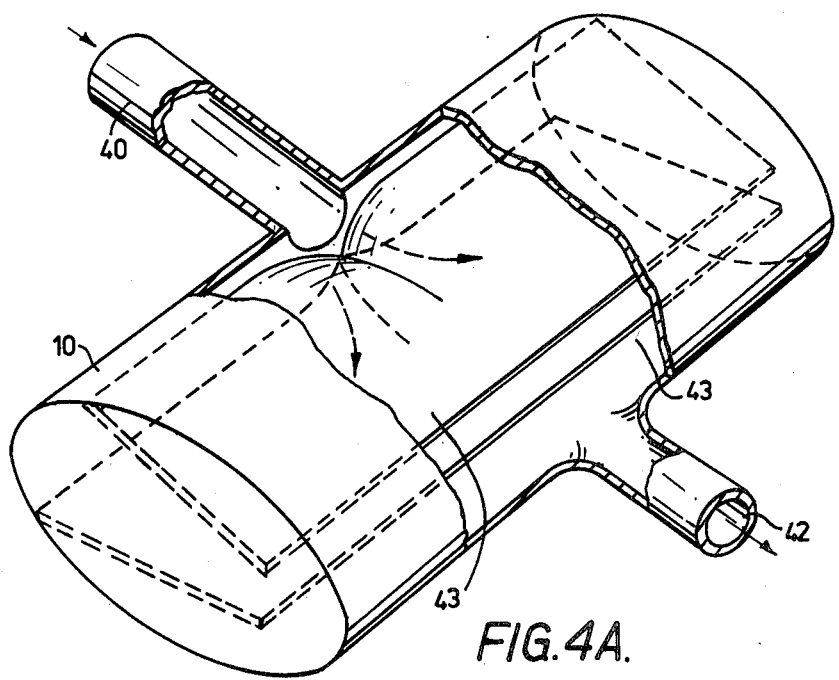

In the embodiments of FIGS. 4 and 4A the muffler casing 10 is of elliptical cross-section having a central inlet 40 and two outlets 42 and 42A located in end walls 41 and 41A respectively. In this construction the muffler includes an apertured separator or separators 43 mounted to extend longitudinally within the casing to divide the casing into two regions having relatively large surface areas or slots of restricted cross-sectional outlet areas. The separator 43 has a chevron shaped central portion 43A and the apex of the chevron is located adjacent the inlet pipe 40 which communicates with what may be regarded as the upper area (as seen in FIG. 4) of the muffler whereas the outlets 42 and 42A enter the end walls 41 and 41A at points below the separator in what might be regarded as the lower area of the muffler.

Figure 5:
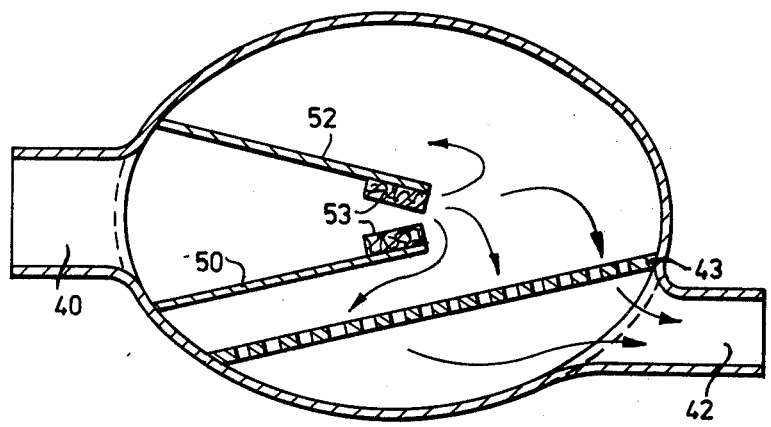
FIG. 5 is a transverse section of a modification of the muffler of FIG. 4.

FIG. 5 shows an embodiment similar to the embodiment of FIG. 4 except, in this case, the incoming gases from inlet pipe 40 enter the upper part of the muffler between converging plates 50 and 52 in the exit mouth of which there is located a catalytic material or filter material 53 for purifying noxious gases contained within vehicle exhaust. The converging plates 50 and 52 may be replaced by a fantail unit. In this embodiment, a single and centrally located outlet 42 is employed.

Figure 6:
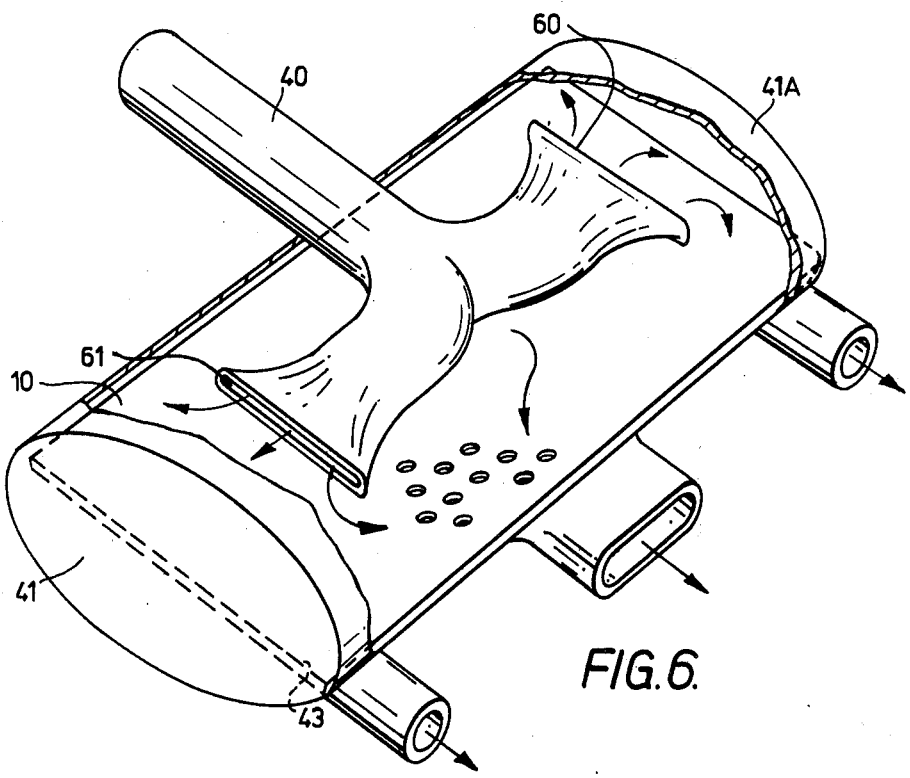
FIG. 6 is a perspective of yet another muffler in accordance with the invention.

In the embodiment of FIG. 6 the separator is disposed as shown and the inlet gases are fed into the upper part of the muffler through two fantails 60, 61, the outlets of which may be fitted with a catalyst or filter material for purifying exhaust gases. In FIG. 6 the outlets may be located in either a central position or in positions adjacent the ends 41, 41A of the casing.

What I claim is:

1. A muffler of the dissipative type comprising an enclosed casing having three side walls arranged to form a triangular tube means and closed by a pair of end walls, the interior surfaces of said side walls being smooth and unobstructed, an inlet means including at least one inlet pipe extending through one of said end walls and so shaped as to provide a reduced narrow walled end portion terminating in a narrow slit extending in a plane intersecting the direction of movement of gas through said inlet pipe and intersecting a plane normal to said direction, the pipe disposed relative to one of said side walls so that gas passes through said inlet pipe and impinges upon the said one wall of said tube, an extension of of the line of the slit intersecting the plane defined by said one side wall so that said gas is reflected to a side wall adjacent to said one wall and to successive adjacent side walls of said triangular tube in a circumferential flow while moving toward one of said end walls, said triangular tube means being so shaped as to encourage the successive reflection of said gas from said adjacent walls, and outlet pipe means extending through an end wall through which gas passes out from the casing.

2. The muffler of claim 1, wherein the outlet pipe is disposed at the apex of the triangular casing.

3. The muffler according to claim 1, wherein said muffler contains two inlet pipes.

4. A muffler according to claim 1 wherein said outlet pipe means is unrestricted and extends into the casing.

5. A muffler according to claim 4, wherein those portions of the inlet and outlet pipe located in the casing are disposed in longitudinal overlapping relationship.

* * * * *